Nov. 25, 1969     O. B. CRUSE     3,480,334
CONTROL VALVE
Filed March 29, 1968     2 Sheets-Sheet 1
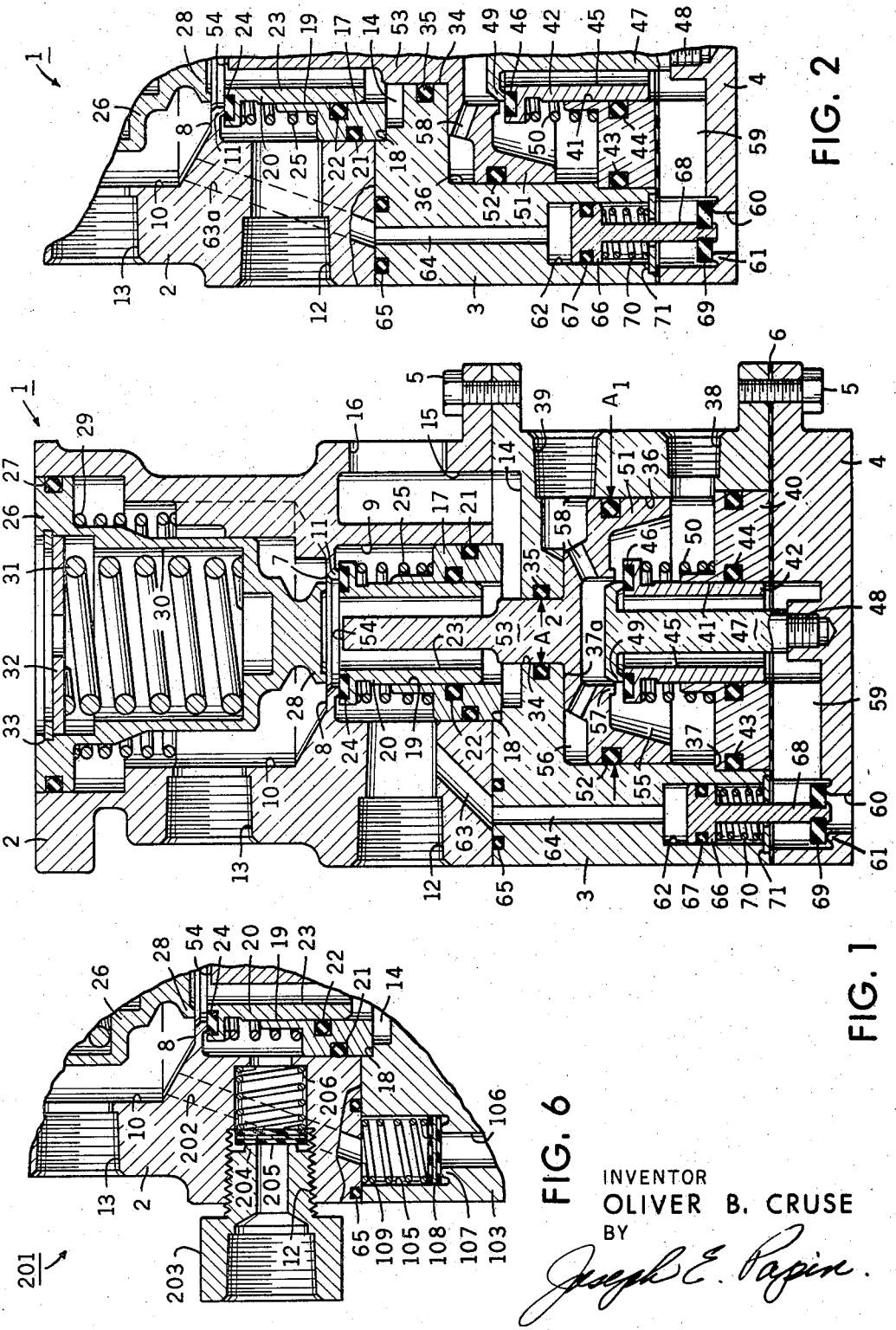
INVENTOR
OLIVER B. CRUSE
BY
Joseph E. Papin.

Nov. 25, 1969  O. B. CRUSE  3,480,334
CONTROL VALVE
Filed March 29, 1968  2 Sheets-Sheet 2
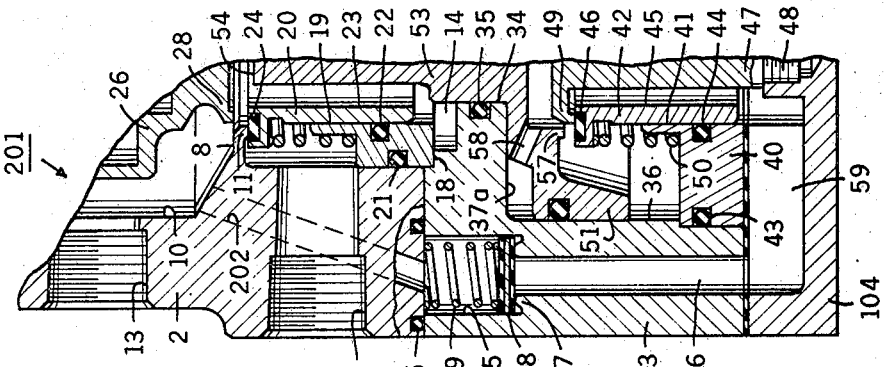
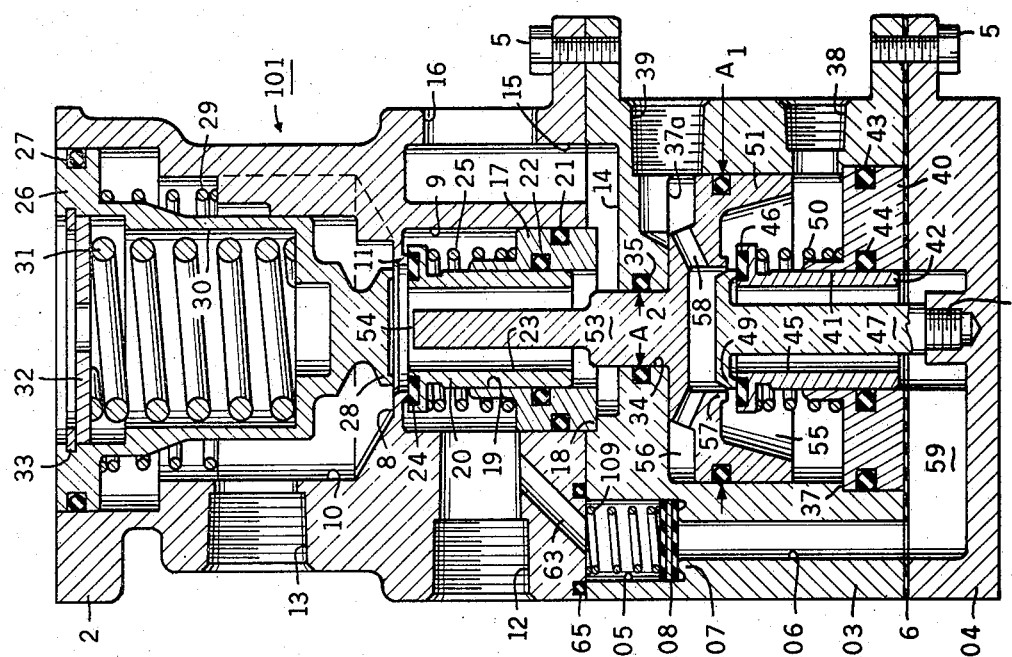
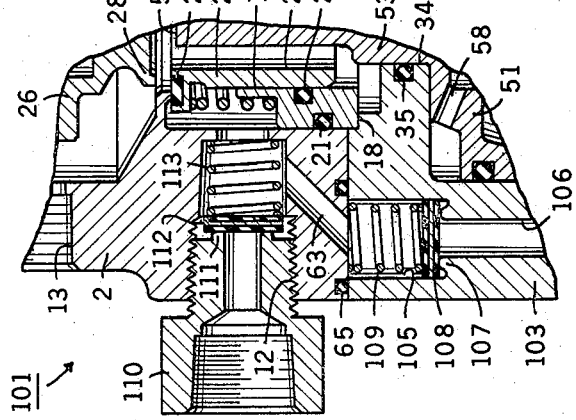
INVENTOR
OLIVER B. CRUSE
BY
*Joseph E. Papin*

United States Patent Office 3,480,334
Patented Nov. 25, 1969

3,480,334
CONTROL VALVE
Oliver B. Cruse, Florissant, Mo., assignor to Wagner Electric Corporation, Newark, N.J., a corporation of Delaware
Filed Mar. 29, 1968, Ser. No. 717,299
Int. Cl. B60t 15/16, 17/02
U.S. Cl. 303—13                        29 Claims

ABSTRACT OF THE DISCLOSURE

A control valve having means movable therein from a normal position effecting the application through said control valve of fluid pressure supplied thereto toward another position isolating the supplied and applied fluid pressures to effect the exhaustion of the applied fluid pressure, and means movable in said control valve in response to a control fluid pressure to obviate the exhaustion of the applied fluid pressure.

---

This invention relates to control valve and in particular to those control valves for controlling the actuation of a spring set brake device.

In the past, control valve were provided with service application means normaly movable during normal vehicle operating conditions in response to an applied force to selectively apply service fluid pressure to the fluid pressure responsive service member of a spring set brake cylinder to effect the normal or service energization of a brake device connected therewith. The control valve was also provided with emergency application means for applying emergency fluid pressure to the spring set brake cylinder to maintain the spring driven member thereof in its inoperative position, and said emergency application means was driven by the service application means upon movement thereof in excess of a predetermined amount, such as for instance under emergency vehicle operating conditions in the event of the failure of the service fluid pressure, toward a position isolating the applied emergency fluid pressure from its source and effecting the meter exhaustion of the applied fluid pressure to the atmosphere to permit actuation of the spring driven member of said spring set brake cylinder and mechanically energize the brake device connected therewith. One of the disadvantageous or undesirable features of such past control valves was that in the event of a quick stop during normal vehicle operating conditions, the emergency application means would be concertedly actuated by the service application means. In other words, a quick or sudden applied force on the service application means would not only effect the service braking application but also drive the emergency application means to effect an unnecessary emergency braking application. Another disadvantageous or undesirable feature of such past control valve was that the unnecessary emergency braking applications, effected as aforementioned, resulted in the continual exhausting of emergency fluid pressure which necessitated the continual generation of "make-up" fluid pressure therefor. Still another disadvantageous or undesirable feature of such past control valves was that the intensity of such unexpected emergency braking applications was not only somewhat severe but also unexpected, thereby affecting the driver controllability over the vehicle.

The principal object of the present invention is to provide a control valve which overcomes the aforementioned disadvantageous or undesirable features, and this, as well as other objects and advantageous features of the present invention, will become apparent in the specification which follows.

Briefly, the present invention embodies a control valve having means movable between a normal position effecting the application through said control valve of fluid pressure supplied thereto and another position to isolate the supplied and applied fluid pressures and to vent the applied fluid pressure, and other means responsive to a control fluid pressure for obviating the venting of the applied fluid pressure.

In the drawings, which illustrate the embodiments of the present invention and wherein like numerals refer to like parts whever they occur:

FIG. 1 is a sectional view illustrating a control valve embodying the present invention in cross-section;

FIG. 2 is a fragmentary sectional view taken from FIG. 1 showing an alternative construction also embodied in the present invention in cross-section;

FIG. 3 is a sectional view illustrating another control valve embodying the present invention in cross-section;

FIGS. 4, 5 and 6 are fragmentary sectional views taken from FIG. 3 showing alternative constructions also embodied in the present invention in cross-section.

Referring now to FIG. 1, a control valve 1 is provided with upper and lower housings and an end plate 2, 3 and 4 which are connected by suitable means, such as studs 5, and a gasket or seal 6 is interposed between said lower housing end plate.

The upper housing 2 is provided with a bore 7 defining an annular wall or partition 8 axially positioned between a counterbore 9 and stepped counterbores 10 which respectively define a set of inlet and outlet chambers, and a valve seat 11 is defined on said wall in circumscribing relation with said bore. A service inlet port 12 is provided in the upper housing 2 connecting with the counterbore 9, and a service outlet port 13 is also provided in said upper housing connecting with the counterbore 10. A recess 14 is provided in the upper portion of the lower housing 3 beneath the counterbore 9 forming an exhaust chamber communicating with an exhaust passage and port 15, 16 provided in the upper housing 2. A valve guide member 17 is received in the lower end of the counterbore 9 in engagement with a shoulder 18 provided on the lower housing 3 in the recess 14 thereof. The valve guide member 17 is provided with a bore 19 in which an inlet valve element 20 is slidable, and seals 21, 22 are carried by said valve guide member in sealing engagement with the counterbore 9 and said inlet valve element, respectively. The inlet valve element 20 is provided with an axial bore or vent passage 23 therethrough, and an annular sealing member or disc 24 is provided on the upper end of said inlet valve element in circumscribing relation with said vent passage, said sealing member being normally urged into sealing engagement with the upper housing valve seat 11 by a valve spring 25 biased between said inlet valve element and the valve guide member 17.

An application or valve control member 26 is slidably received in the counterbore 10 and carries a seal 27 in sealing engagement with said counterbore. The valve control member or service piston 26 is provided with a valve seat 28 on the lower end thereof which is coaxial with the upper housing bore 7 and normally maintained in spaced relation with the inlet valve seal 24 by a return spring 29 biased between said service piston and the upper housing 2. A metering spring bore 30 is provided in the service piston 26, and a pre-compressed metering spring 31 is retained therein by a retainer or treadle force receiving plate 32 which is biased into abutment with a snap ring and groove assembly 33 provided in the upper end of said metering spring bore.

The lower housing 3 is provided with a bore 34 having a seal 35 disposed therein, and the upper end of said bore intersects with the recess 14 while the lower end thereof intersects with stepped counterbores 36. The stepped counterbores 36 define a shoulder 37 therebetween on the lower housing 3, and another shoulder 37a is defined on said lower housing at the juncture of the bore 34 with the smaller of said stepped counterbores 36. An emergency inlet port 38 is provided in said housing intersecting the smaller of said stepped counterbores 36 adjacent the lower end thereof, and an emergency outlet port 39 intersects the smaller of said stepped counterbores adjacent to the shoulder 37a. Another valve guide member 40 is received in the larger of the stepped counterbores 36 between the housing shoulder 37 and end plate 4. The valve guide member 40 is provided with a bore 41 in which an inlet valve element 42 is slidable, and seals 43, 44 are carried by said valve guide member in sealing engagement with the larger of the stepped counterbores 36 and said inlet valve element, respectively. The inlet valve element 42 is provided with an axial bore vent passage 45 therethrough, and an annular sealing member or disc 46 is provided on the upper end of said inlet valve element in circumscribing relation with said vent passage. A seating member 47 extends coaxially through the valve element bore 45 having one end thereof connected with the end plate 4 at 48 and the other end thereof defining a valve seat 49 in the smaller of the stepped counterbores 36 for engagement with the inlet valve seal 46. A valve spring 50 is biased between the inlet valve element 42 and the valve guide member 40 normally urging the seal 46 of said inlet valve element 42 into sealing engagement with the valve seat 49.

An application or valve control member 51 having a peripheral seal 52 therein slidably received in the smaller stepped counterbore 36 between the inlet and outlet ports 38, 39, and a stem or driven connection 53, integrally formed with said valve control member or emergency piston, is slidably received in the lower housing bore 34 in sealing engagement with the seal 35 therein, said stem having an upper free end or driven portion 54 predeterminately spaced from the valve control member seat 28 for lost motion connection therewith when said emergency piston is in its normal position engaged with the housing shoulder 37a, as described hereinafter. An inlet chamber 55 is defined in the lower housing 3 between the lower end of the emergency piston 51 and the valve guide 40 in open pressure fluid communication with the emergency inlet port 38, and an outlet chamber 56 is defined between the upper end of said valve control member and the shoulder between the lower housing bore 34 and the smaller stepped counterbore 36 in open pressure fluid communication with the emergency outlet port 39. A valve seat 57 is provided on the lower end of the emergency piston 51 for engagement with the valve element 42 about the valve seat 49, and a passage 58 is provided in said emergency piston having one end connecting with the outlet chamber 56 and the other end extending through said valve seat. It should be noted that the emergency piston 51 is provided with an effective input area $A_1$ substantially defined across the seal 52 which is subjected to the fluid pressure at the emergency inlet port 38, and the stem portion 53 is provided with an effective area $A_2$ substantially defined across the seal 35; therefore, the emergency piston 51 is also provided with an effective output area $A_1-A_2$ which is subjected to the fluid pressure at the emergency outlet port 39 at all times, said output area $A_1-A_2$ being, of course, opposed to and predeterminately less than the input area $A_1$. It should also be noted that the control valve 1 is adapted for connection in a well-known braking system (not shown) as disclosed in U.S. Patent No. 3,309,149 issued on Mar. 14, 1967, to Richard C. Butler wherein the inlet ports 12, 38 are adapted for connection with the usual service and emergency tanks and the outlets 13, 39 are adapted for connection with the service and emergency portions of the usual spring set brake cylinder.

The end plate 4 is provided with a vent chamber 59 which communicates the vent passage 45 of the valve element 42 with the atmosphere through an exhaust port 60 provided in said end plate, and a valve seat 61 is provided on said end plate about said exhaust port. The lower housing 3 is also provided with a control bore 62 having its lower end intersecting with the exhaust chamber 59 and substantially aligned with the exhaust port 60 and its upper end connected in pressure fluid communication with the inlet port 12 by interconnecting passages 63, 64 provided in the upper and lower housings 2, 3, and a seal 65 is provided between said upper and lower housings about the interconnection of said passages 63, 64. A control piston or valve member 66 having a peripheral seal 67 is slidably received in the control bore 62, and a stem portion 68 integrally formed on said control piston extends coaxially through said control bore into the vent chamber 59 having an exhaust preventing or shut-off valve 69 on the free end thereof for engagement with the valve seat 61. A return spring 70 is biased between the control piston 66 and a retainer or abutment 71 on the end plate 4 to normally urge the shut-off valve 69 toward a position disengaged from the valve seat 61.

In the operation, the service fluid pressure at the service inlet port 12 flows through the housing passages 63, 64 and acts on the control piston 66 to establish a control force urging said control piston against the return spring 70 toward a position engaging the shut-off valve 69 with the exhaust valve seat 61 isolating the vent chamber 59 from the atmosphere, and the emergency fluid pressure at the emergency inlet and outlet ports 38, 39 acts on the opposed effective areas $A_1$ and $A_1-A_2$ to establish a differential force urging the emergency piston 51 upwardly toward its normal or original position in abutting engagement with the housing shoulder 37a, as shown.

If the operator desires to effect a service braking application of the vehicle under normal operating conditions, a manually applied force on the force receiving plate 32 of the control valve 1 is transmitted through the metering spring 31 to the service piston 26 to move said service piston downwardly against its return spring 29. This downward movement initially engages the service piston valve seat 28 with the valve member 20 closing the vent passage 24 thereof and isolating the outlet chamber 10 from the atmosphere, and further downward movement thereafter urges said valve member against its return spring 25 to a position disengaged from the housing valve 11 to establish pressure fluid communication between the service inlet and outlet ports 12, 13. When the reaction force created by the established fluid pressure in the outlet chamber 10 acting on the effective area of the service piston 26 therein equals the manually applied force, said service piston is moved upwardly against the metering spring 31 wherein the inlet valve 20 is positioned in lapped engagement between the upper housing valve seat 11 and the piston valve seat 28. The reaction force acting through the metering spring 31 affords the operator a direct and accurate "feel" as to to the extent or intensity of the service braking effort or application. If a greater service braking application is desired, the manually applied force is increased which results in an increased application force, and the component parts of the control valve 1 function in the same manner as previously described.

When the desired service braking effort is attained, the manually applied force is removed from the service piston 26, and the return spring 29 moves said service piston upwardly toward its original position disengaging the piston valve seat 28 from the valve element 20 to again open the valve element vent passage 23 re-establishing communication between the outlet and exhaust ports 13, 16 to exhaust the established fluid pressure to the atmosphere and eliminate the reaction force.

Of course, in the event of quick or panic type stops during normal vehicle operation wherein the operator force must be quickly applied to actuate the control valve 1, it is often the case that the intensity of such a quickly applied force is much greater than that actually needed to effect the stop; therefore, before the operator can react to lessen the intensity of such a quickly applied force, the service piston 26 is driven downwardly not only to actuate the valve element 20 but also into driving engagement with the driven end 54 of the emergency piston 51 to also effect concerted downward movement thereof. The concerted downward movement of the emergency piston 51 initially engages the valve seat 57 thereof with the valve element 42 isolating the emergency fluid pressure at the emergency inlet and outlet ports 38, 39 and thereafter moves said valve element toward a position disengaged from the valve seat 49 to establish pressure fluid communication between said emergency outlet port and the vent chamber 59; however, venting of the emergency fluid pressure from said emergency outlet port through the emergency piston passage 58, the valve element passage 45 and said vent chamber to the atmosphere is obviated since the exhaust port 60 is closed by the engagement of the shut-off valve 69 with the valve seat 61, as previously mentioned. In this manner, the shut-off valve 69 is actuated in response to the service fluid pressure at the service port 12 to prevent the unnecessary venting of emergency fluid pressure from the emergency outlet port 39 to the atmosphere due to a quick or panic type actuation of the control valve 1 under normal vehicle operation intended merely to effect a service braking application and not an emergency braking application, which is properly effected only under emergency vehicle operating conditions, as described hereinafter. Further, it is obvious that the shut-off valve 69 conserves emergency fluid pressure by obviating the unnecessary and unwarranted venting thereof to the atmosphere and thereby eliminates the necessity of generating "make-up" or replacement emergency fluid pressure in the system (not shown). It is also obvious that the prevention of the venting of the emergency fluid pressure to the atmosphere by the shut-off valve 69 obviates undesired emergency braking applications under normal vehicle operating conditions which seriously impair controllability of the vehicle.

Under emergency vehicle operating conditions, such as in the event of the failure of the service fluid pressure at the service inlet port 12, the control force on the control piston 66 is, of course, eliminated, and the return spring 70 moves said control piston toward its inoperative position disengaging the shut-off valve 69 from the valve seat 61 to re-establish communication between the vent chamber 59 and the atmosphere. Under such emergency vehicle operating condition, the manually applied force moves the piston 26 downwardly to actuate the valve element 20; however, since it was assumed that the service fluid pressure at the service inlet port 12 has failed, thereby effecting such emergency conditions, the establishment of fluid pressure at the service outlet port 13 is, of course, obviated, and further downward applied force movement of the piston 26 engages the seat 28 thereof with the emergency piston driven end 54 to thereafter effect concerted downward movement of the emergency piston 51 therewith to actuate the valve element 42, as previously mentioned, and establish metered pressure fluid communication between the emergency outlet port and exhaust port 39, 60 when the shut-off valve 69 is in its open position. When the valve element 42 is disengaged from the valve seat 49 to effect such metered exhaustion of the emergency fluid pressure from the outlet port 39, it should be noted that the effective area $A_1$ is subjected to the isolated emergency fluid pressure at the inlet port 38 and the opposing effective area $A_1-A_2$ is subjected to the reduced fluid pressure at the outlet port 39 to establish a differential reaction force across the emergency piston 51 which is transmitted through its stem 53 and the service piston 26 to the metering spring 31 in opposition to the manually applied force thereon. When the magnitude of the differential reaction force equals that of the applied force, the service and emergency pistons 26, 51 are concertedly moved upwardly against the metering spring 31 wherein the valve element 42 is positioned in lapped engagement with the emergency piston valve seat 57 and the valve seat 49. The differential reaction force acting through the metering spring affords the operator a direct and accurate "feel" as to the extent or intensity of the emergency braking effort or application under such emergency conditions. If a greater emergency braking effort is desired under the emergency conditions, the manually applied force is increased which results in an increased differential reaction force wherein the component parts of the control valve 1 function in the same manner as previously described to again move said component parts to their lapped positions.

When the desired braking effort is obtained under the emergency conditions, the manually applied force is removed from the service piston 26 and the differential reaction force plus the force of the springs 25, 29 and 50 serve to move the component parts of the control valve 1 upwardly toward their original positions disengaging the service piston 26 from the valve element 20 and disengaging the emergency piston valve seat 57 from the valve element 42 to re-establish pressure fluid communication between the inlet and outlet ports 38, 39.

Referring now to FIG. 2, an alternate construction for control valve 1 is shown wherein a passage 63a is provided in the housing 2 in place of the previously described passage 63 and has one end connected in pressure fluid communication with the service outlet port 13 and the other end thereof interconnected with the passage 64. During normal vehicle operating conditions, the established service fluid pressure at the service outlet port 13 is transmitted through the passages 63a, 64 into the control bore 62 acting on the control piston 66 therein and establishing the control force to move the shut-off valve 69 into engagement with the valve seat 61 and isolate the vent chamber 59 from the atmosphere. Therefore, it is obvious that the shut-off valve 69 is actuated to close the exhaust port 60 obviating the venting of the emergency fluid pressure from the emergency port 39 to the atmosphere due to a quick or panic type actuation of the control valve 1 under normal vehicle operating conditions. Under emergency vehicle operating conditions in the event of the failure of the service fluid pressure at the service inlet and/or outlet ports 12, 13, the service fluid pressure necessary to actuate the control piston 66 is, of course, unavailable; therefore, the shut-off valve 69 remains urged by its return spring 70 toward its open or normal position to permit the venting of the emergency fluid pressure from the emergency outlet port 39 through the exhaust port 60 to the atmosphere upon the actuation of the control valve 1 under such emergency conditions, as previously described.

Referring now to FIG. 3, another control valve 101 is shown having substantially the same component parts and functioning in substantially the same manner as the previously described control valve 1 with the following exceptions. The control valve 101 is provided with a lower housing 103 and end plate 104, said lower housing having stepped passages 105, 106 therein defining a valve seat 107. The upper end of the stepped passage 105 interconnects with the passage 63, and the lower end of the stepped passage 106 is connected with the vent chamber 59 in the end plate 104. A check or shut-off valve 108 is movable in the stepped passage 105 having one side thereof normally urged into engagement with the valve seat 107 to close said stepped passages by a return spring 109 biased between the other side of said check valve and the housing 2.

In the operation of the control valve 101 under normal vehicle operating conditions, the service fluid pressure at the service port 12 acts on the upper side of the shut-off valve 108 to establish the control force for maintaining said shut-off valve in engagement with its seat 107. The quick or panic type actuation of the control valve 101 under normal operating conditions, as previously described for the control valve 1, effects the venting of the emergency fluid pressure from the emergency outlet port 36 through the emergency piston passage 58, the valve element passage 45 into the vent chamber 59 and therefrom into the stepped passage 106 acting on the lower side of the shut-off valve 108 to create another force in opposition to the control force acting on said shut-off valve; however, the control force normally maintains said shut-off valve engaged with its seat 107 to prevent the passage of such vented emergency fluid pressure. Under emergency vehicle operating conditions in the event of the failure of the service fluid pressure at the service port 12, the control force acting on the shut-off valve 108 is, of course, eliminated, and the opposing force established by the venting of emergency fluid pressure from the emergency outlet port 39 when the control valve 101 is actuated under such emergency operating conditions moves the shut-off valve 108 against its return spring 109 to a position disengaged from the valve seat 107 permitting the passage therethrough of the vented emergency fluid pressure to the atmosphere via the passages 105 and 63a, the inlet and outlet chambers 9, 10 which are in pressure fluid communication when the valve element 20 is actuated, and the service inlet port 12 at which the service fluid pressure was assumed to have failed.

Referring now to FIG. 4, another alternate construction for the control valve 101 is shown wherein a fitting 110 is received in the service inlet port 12 defining a portion thereof, and the inner end of said fitting defines a valve seat 111 in circumscribing relation to said service inlet port. Another check valve 112 is biased into engagement with the valve seat 111 by a spring 113 to permit unidirectional flow of service fluid pressure only through said service inlet port into the inlet chamber 9. Under emergency vehicle operating conditions in the event of the failure of the service fluid pressure at the service inlet port 12, it is, of course, obvious that the check valve 112 seals off said service inlet port, and the service fluid pressure necessary to effect the control force for maintaining the shut-off valve 108 engaged with its seat 107 is unavailable; therefore, the opposing force on said shut-off valve established by the venting of the emergency fluid pressure from the emergency outlet port 39 when the control valve 101 is actuated under such emergency operating conditions moves said shut-off valve against its return spring 109 to a position disengaged from its valve seat 107 permitting the passage therethrough of the vented emergency fluid pressure via the passages 105, 63 and the inlet chamber 9 into the outlet chamber 10 and the service outlet port 13. In this manner, the passage of the vented emergency fluid pressure from the emergency outlet port 39 to the service outlet port 13 with the failed service inlet port 12 checked by the valve 112 permits the utilization of the vented emergency fluid pressure in the service portion of the system (not shown) connected with the service outlet port 13. When the operator applied force is removed to permit the return of the service and emergency pistons 26, 53 to their original positions, the vented emergency fluid pressure at the service outlet port 13 is exhausted to atmosphere through the outlet chamber 10, the valve element passage 23, and the housing recess and passages 14, 15 to the exhaust port 16.

Referring now to FIG. 5, another control valve 201 is shown having substantially the same component parts and functioning in substantially the same manner as the previously described control valves 1 and 101 with the following exceptions. The control valve 201 is provided with a passage 202 in the housing 2 having one end connected in pressure fluid communication with the service outlet port 13 and the other end thereof interconnected with the stepped passage 105. During normal vehicle operating conditions, the established service fluid pressure at the service outlet port 13 is transmitted through the passage 202 into the stepped passage 105 acting on the upper side of the shut-off valve 108 to establish the control force urging said shut-off valve in engagement with its seat 107. When the emergency fluid pressure at the emergency outlet port 39 is vented into the vent chamber 59 and stepped passage 106, due to quick or panic type actuation of the control valve 201 under normal vehicle operating conditions, it is obvious that the control force will maintain the shut-off valve 108 in its closed position against the opposing force of the vented emergency fluid pressure in the stepped passage 106 acting on the lower side of said shut-off valve. When the operator applied force is removed to permit the return of the actuated service and emergency pistons 26, 51 to their original positions, the established service fluid pressure at the outlet port 13 is exhausted to atmosphere eliminating the control force acting on the shut-off valve 108, and the opposing force thereafter moves said shut-off valve to its open position disengaged from its valve seat 107 to also effect the exhaustion of the vented emergency fluid pressure therewith through the stepped passage 105, the passage 202, the outlet chamber 10, the valve element passage 23, the housing recess 14 and passage 15 to the exhaust port 16; however, it should be noted that the volume of vented emergency fluid pressure so exhausted is minimal since the valve element 42 is returned to its original position into engagement with its valve seat 49 isolating the emergency outlet port 39 from the vent chamber 59 upon the removal of the operator applied force to de-actuate the service and emergency pistons 26, 51 which is prior to the exhaustion of the established service fluid pressure from the service outlet port 13.

Under emergency vehicle operation in the event of the failure of the service fluid pressure at the service inlet and/or outlet ports 12, 13, the service fluid pressure necessary to establish the control force for maintaining the shut-off valve 108 engaged with its seat 107 is, of course, unavailable and said control force is eliminated; therefore, the opposing force established by the venting of emergency fluid pressure from the emergency outlet port 39 when the control valve 201 is actuated under such emergency operating conditions moves the shut-off valve 108 against its return spring 109 to a position disengaged from the valve seat 107 permitting the passage therethrough of the vented emergency fluid pressure to the atmosphere via the passages 105 and 202 and either one of the service inlet and outlet ports 12, 13 at which the service fluid pressure was assumed to have failed.

Referring now to FIG. 6, an alternate construction is shown for the control valve 201 wherein a fitting 203 is received in the service inlet port 12 defining a portion thereof, and a valve seat 204 is provided on said fitting in circumscribing relation with said service inlet port. A check valve 205 is biased toward engagement with the valve seat 203 by a return spring 206 to permit unidirectional flow of the service fluid pressure only through the service inlet port 12 into the inlet chamber 9. Under emergency vehicle operating conditions in the event of the failure of the service fluid pressure at the service inlet port 12, it is, of course, obvious that the check valve 205 seals off said service inlet port and that the service fluid pressure at the service outlet port 13 necessary to establish the control force for maintaining the shut-off valve 108 engaged with its seat 107 is also unavailable; therefore, the opposing force established by the venting of emergency fluid pressure from the emergency outlet port 39 when the control valve 201 is actuated under such emergency conditions moves said shut-off valve against its return spring 109 to its position disengaged from said valve seat permitting the passage therethrough of the vented emergency fluid pressure via the passages 105 and 202 into the outlet chamber 10 to the service outlet port 13. Of course, the valve element 20 is actuated to its open position by the service piston 26 in response to the operator applied force thereon, thereby establishing open pressure fluid communication between the inlet and outlet chambers 9, 10, but since the check valve 205 is engaged with its seat 204 to close the service inlet port 12 at which the service fluid pressure was assumed to have failed, the vented passage of the emergency fluid pressure from the emergency outlet port 39 to the service outlet port 13 permits the utilization of such vented emergency fluid pressure in the service portion of the system (not shown) connected with the service outlet port 13. When the operator applied force is removed to permit the return of the service and emergency pistons 26, 51 to their original positions, the vented emergency fluid pressure at the service outlet port 13 is exahusted to atmosphere through the outlet chamber 10, the valve element passage 23, and the housing recess and passages 14, 15 to the exhaust port 16.

It is now apparent that novel control valves 1, 101 and 201 meeting the objects and advantages set out hereinbefore, as well as other advantageous features apparent from the specification, are provided and that changes in the precise configurations, shapes or details of the constructions set forth in the disclosure by way of illustration may be made by those skilled in the art without departing from the spirit of the invention.

The embodiments of the invention in which an exclusive property or privilege is claimed are defined as follows:

1. A control valve comprising a housing, means movable in said housing between one position effecting the application through said housing of fluid pressure supplied thereto and another position isolating the supplied fluid pressure from the applied fluid pressure and venting the applied fluid pressure to the atmosphere, second means movable in said housing for operative engagement with said first named means, said second means being movable in response to a force applied thereto to engage and move said first named means toward its other position, and other means for subjection to a control fluid pressure and movable in said housing independently of said first named and second means to control the passage of the vented applied fluid pressure to the atmosphere, said other means being urged toward a position in said housing obviating the passage therethrough of the vented applied fluid pressure to the atmosphere when subjected to the control fluid pressure.

2. The control valve according to claim 1, comprising resilient means urging said other means toward another position in said housing to permit the passage of the vented applied fluid pressure in the event of the failure of the control fluid pressure.

3. The control valve according to claim 2, comprising opposed areas on said second means respectively subjected to the isolated supplied fluid pressure and a reduction in the magnitude of the applied fluid pressure to establish a force opposing the applied force when said other means is in its other position permitting the passage of the vented applied fluid pressure to the atmosphere to effect the reduction in the magnitude of the applied fluid pressure.

4. The control valve according to claim 1, comprising means within said housing including said first named and second means defining passage means for passing the vented applied fluid pressure to the atmosphere when said second means is in its other position, said other means closing said passage means to obvite the passage of the vented applied fluid pressure therethrough.

5. The control valve according to claim 4, comprising a valve seat on said housing about said passage means, said other means being urged into engagement with said valve seat to close said passage means and obviate the passage of the vented applied fluid pressure therethrough.

6. The control valve according to claim 5, wherein said other means includes a valve element having a portion thereof subjected to the control fluid pressure, and a sealing portion opposed to said first named portion and extending into said passage means for sealing engagement with said valve seat.

7. The control valve according to claim 6, comprising a bore in said housing having one end connected with said passage means and the other end thereof subjected to the control fluid pressure, said first named portion of said valve element being slidable in said bore between said one and other ends thereof, and resilient means connected between said housing and valve element urging said sealing portion thereof toward a position disengaged from said valve seat to permit the passage of the vented applied fluid pressure through said passage means in the event of failure of the control fluid pressure.

8. The control valve according to claim 1, comprising application means normally movable in said housing to effect the application through said housing of another fluid pressure supplied thereto and also movable in excess of a predetermined amount into driving engagement with said second means concertedly urging said first named means toward its other position, and one of the other supplied and applied fluid pressures defining the control fluid pressure acting on said other means.

9. The control valve according to claim 8, comprising resilient means urging said other means toward another position in said housing to permit the passage of the vented first named applied fluid pressure in the event of the failure of said one of the other supplied and applied fluid pressures.

10. The control valve according to claim 8, comprising means within said housing including said first named means defining passage means for venting the first named applied fluid pressure to the atmosphere when said first named means is in its other position, said other means extending into said passage means and urged in response to said one of the other supplied and applied fluid pressures acting thereon toward a position closing said passage means to obviate the passage of the vented first named applied fluid pressure therethrough.

11. The control valve according to claim 10, comprising a valve seat on said housing about said passage means, said other means being urged in response to said one of the other supplied and applied fluid pressures acting thereon into engagement with said valve seat closing said passage means.

12. The control valve according to claim 11, wherein said other means includes a valve element having a portion subjected to said one of the other supplied and applied fluid pressures, and a sealing portion opposed to said first named portion for sealing engagement with said valve seat.

13. The control valve according to claim 12, comprising a bore in said housing connected with said passage means, said first named portion of said valve element being slidable in said bore, other passage means in said housing connecting said bore with said one of the other supplied and applied fluid pressures, and a spring engaged with said valve element urging said sealing portion thereof toward a position disengaged from said valve seat to permit the passage of the vented first named applied fluid pressure through said first named passage means in the event of the failure of said one of the other supplied and applied fluid pressures acting on said first named portion of said valve element.

14. The control valve according to claim 8, comprising means within said housing including said first named and second means defining passage means having one end for subjection to said one of the other supplied and applied fluid pressures and the other end thereof for subjection to the vented first named applied fluid pressure when said first named means is in its other position, and said other means including valve means movable in said passage means and urged in response to said one of the other supplied and applied fluid pressures acting thereon toward a position closing said passage means, said valve means also being movable in response to the vented first named applied fluid pressure acting thereon when said first named means is in its other position toward another position opening said passage means to permit the passage of the vented first named applied fluid pressure therethrough to atmosphere in the vent of the failure of said one of the other supplied and applied fluid pressures.

15. The control valve according to claim 8, comprising means within said housing including said first named and second means defining passage means having one end connected in pressure fluid communication with the other applied fluid pressure and the other end thereof connected in pressure fluid communication with the vented first named applied fluid pressure when said first named means is in its other position, a valve seat on said housing about said passage means, and said other means including valve means movable in said passage means and having opposed sides, one of said opposed sides being subjected to the other supplied fluid pressure to establish a force normally urging the other of said opposed sides into engagement with said valve seat to close said passage means against an opposing force of the vented first named applied fluid pressure acting on said other side when said first named means is in its other position, and said opposing force urging said valve means toward a position disengaged from said valve seat to open said passage means and effect the passage of the vented first named applied fluid pressure therethrough upon the failure of the other supplied fluid pressure.

16. The control valve according to claim 15, comprising other valve means movable in said housing and urged toward a closed position therein closing communication between the other supplied fluid pressure and said one end of said passage means connected therewith and also between the other supplied fluid pressure and the other applied fluid pressure upon the failure of the other supplied fluid pressure, said passage means being connected in pressure fluid communication with the other applied fluid pressure when said other valve means is in its other position wherein the magnitude of the vented first named applied fluid pressure passed through said passage means is additive to that of the other applied fluid pressure, a resilient means opposing the applied force movement of said other application means and urging said other application means toward its original position in said housing isolating the other supplied fluid pressure from the applied fluid pressure upon the elimination of the applied force, and means for exhausting the other applied fluid pressure to the atmosphere when said other application means is in its original position.

17. The control valve according to claim 8, comprising means within said housing including said first named and second means defining passage means having one end normally subjected to the atmosphere and adapted for selective subjection to the other applied fluid pressure upon the establishment thereof in response to the actuation of said application means and the other end of said passage means being subjected to the vented first named applied fluid pressure when said first named means is in its other position, a valve seat on said housing about said passage means, and said other means including valve means movable in said passage means and having opposed sides, one of said opposed sides being responsive to the other applied fluid pressure when selectively subjected thereto to establish a force urging the other of said opposed sides into engagement with said valve seat closing said passage means against an opposing force of the vented first named fluid pressure acting on said other opposed side when said first named means is in its other position, the opposing force urging said valve means toward a position disengaging said other opposed side from said valve seat to effect the passage of the vented first named applied fluid pressure through said passage means when said one end thereof is subjected to the atmosphere.

18. The control valve according to claim 17, comprising other valve means movable in said housing and urged toward a position isolating the other applied fluid pressure from the other supplied fluid pressure upon the failure thereof.

19. A control valve comprising a housing having a pair of port sets therein, each of said port sets including inlet and outlet ports, a pair of valve means controlling pressure fluid communication between the inlet and outlet ports of said port sets, a pair of valve control members movable in said housing for operative engagement with said valve means, one of said valve control members being movable in response to an applied force to engage and move one of said valve means toward a position establishing pressure fluid communication between the inlet and outlet ports of one of said port sets, a pair of opposed areas on the other of said valve control members for respective subjection to fluid pressure at the inlet and outlet ports of the other of said port sets, said other valve control member being movable toward a position in said housing disengaged from the other of said valve means and establishing pressure fluid communication between the inlet and outlet ports of said other port set in response to the subjection of one of said areas to fluid pressure at the inlet port of said other port set, means for force transmitting engagement between said one and other valve control members responsive to the applied force movement of said one valve control member in excess of a predetermined amount to move said other valve control members into engagement with said other valve means interrupting pressure fluid communication between the inlet and outlet ports of said other port set and thereafter moving said other valve means toward a position for venting the fluid pressure at the outlet port of said other port set to the atmosphere, and other means for subjection to the fluid pressure at one of the inlet and outlet ports of said one port set and movable in said housing to control the passage of the vented fluid pressure from the outlet port of said other port set to the atmosphere, said other means being urged toward a position in said housing obviating the passage therethrough of the vented fluid pressure when subjected to the fluid pressure at said one of the inlet and outlet ports of said one port set.

20. The control valve according to claim 19, comprising resilient means urging said other means toward another position in said housing to permit the passage therethrough to the atmosphere of the vented fluid pressure in the event of the elimination of the fluid pressure at said one of the inlet and outlet ports of said one port set.

21. The control valve according to claim 20, wherein the one area is predetermined greater than the other of said areas, said one area being subjected to the fluid pressure isolated at the inlet port of said other port set and said other area being subjected to the reduced fluid pressure at the outlet port of said other port set upon actuation of said other valve means when said other means is in its other position to establish a reaction force across said other valve control members and acting in a direction opposite to the applied force.

22. The control valve according to claim 19, comprising means within said housing including said other valve control members and other valve means defining passage means between the outlet port of said other port set and the atmosphere for the passage of the vented fluid pressure upon actuation of said other valve means, said other means being movable in said passage means and urged in response to the fluid pressure at said one of the inlet and outlet ports of said one port set toward a position closing said passage means and obviating the passage therethrough to the atmosphere of the vented fluid pressure.

23. The control valve according to claim 22, comprising a valve seat on said housing about said passage means, said other means being urged into engagement with said valve seat closing said passage means.

24. The control valve according to claim 23, wherein said other means includes a valve element having a portion defining with said housing a fluid pressure chamber connected in pressure fluid communication with the fluid pressure at said one of the inlet and outlet ports of said one port set, and a sealing portion in said passage means for sealing engagement with said valve seat.

25. The control valve according to claim 24, comprising a bore in said housing having one end connected in pressure fluid communication with the fluid pressure at said one of the inlet and outlet ports of said one port set and the other end thereof intersection with said passage means, said first named portion of said valve element being slidable in said bore, said chamber being defined in said bore between the one end thereof and said first named portion of said valve element, and resilient means engaged between said housing and said valve element urging said sealing portion thereof toward a position disengaged from said valve seat to permit the passage of the vented fluid pressure therethrough to the atmosphere in the event of the elimination of the fluid pressure at said one of the inlet and outlet ports of said one port set.

26. The control valve according to claim 19, comprising means within said housing including said other valve control member and said other valve means defining passage means having one end portion for connection in pressure fluid communication with the fluid pressure at said one of the inlet and outlet ports of said one port set and the other end thereof for connection with the vented fluid pressure upon actuation of said other valve means, and said other means including a check valve movable in said passage means and urged in response to the fluid pressure at said one of the inlet and outlet ports of said one port set acting thereon toward a position closing said passage means to obviate the passage of the vented fluid pressure therethrough, said check valve also being movable in response to the vented fluid pressure acting thereon when said other valve means is actuated toward another position opening said passage means to permit the passage of the vented fluid pressure therethrough to the atmosphere in the event of the failure of the fluid pressure at said one of the inlet and outlet ports of said one port set.

27. A control valve comprising a housing having a paid of fluid pressure ports therein, valve means movable in said housing for controlling pressure fluid communication between said ports, a valve control member movable in said housing for operative engagement with said valve means, said valve control member being movable in response to an applied force to engage and move said valve means toward a position in said housing interrupting pressure fluid communication between said ports and venting the pressure fluid at one of said ports to the atmosphere, and other m eans for subjection to control fluid pressure and movable in said housing independently of said valve control member to control the passage of the vented fluid pressure from said one port to the atmosphere, said other means being urged toward a position in said housing obviating the passage therethrough of the vented fluid pressure when subjected to said control fluid pressure.

28. A control valve according to claim 27, comprising an exhaust port in said housing, said valve means being normally urged toward a position in said housing interrupting pressure fluid communication between said one port and said exhaust port and being movable to establish pressure fluid communication between said one port and exhaust port for venting the fluid pressure at said one port to the atmosphere upon actuation thereof by said valve control member, a valve seat on said housing about said exhaust port, said other means including other valve means movable in said housing for engagement with said valve seat, said other valve means being urged upon subjection to said control fluid pressure into seating engagement with said valve seat closing said exhaust port and obviating the passage therethrough of the vented fluid pressure from said one port to the atmosphere.

29. A control valve according to claim 27, comprising passage means in said housing having one end for connection in pressure fluid communication with the control fluid pressure and the other end thereof for connection with the vented fluid pressure from said one port, a valve seat on said housing about said passage means and between said one and other ends thereof, said other means including other valve means in said passage means and normally urged in response to the control fluid pressure acting thereon into engagement with said valve seat, and said other valve means also being movable toward a position disengaged from said valve seat in response to the vented fluid pressure from said one port to permit the passage thereof through said passage means to the atmosphere in the event of the falure of the control fluid pressure.

References Cited

UNITED STATES PATENTS

| | | | |
|---|---|---|---|
| 3,219,395 | 11/1965 | Schwartz | 303—40 X |
| 3,265,447 | 8/1966 | Bueler | 303—40 X |
| 3,188,916 | 6/1965 | Beatty | 137—627.5 X |
| 3,309,148 | 3/1967 | Bueler | 303—13 |
| 3,394,968 | 7/1968 | Bueler | 303—68 |

MILTON BUCHLER, Primary Examiner

J. J. McLAUGHLIN, JR., Assistant Examiner

U.S. Cl. X.R.

137—596.18, 627.5; 303—52, 54, 68

UNITED STATES PATENT OFFICE

CERTIFICATE OF CORRECTION

Patent No. 3,480,334                Issued November 25, 1969

Oliver B. Cruse

It is certified that error appears in the above-identified patent and that said Letters Patent are hereby corrected as shown below:

Column 1, line 22, "valve" should read -- valves --; line 25, "valve" should read -- valves --; line 26, "normaly" should read -- normally --. Column 2, line 11, "whever" should read -- wherever --; line 18, after the semicolon (;) insert -- and --. Column 3, line 71, "Butler" should read -- Bueler --. Column 9, line 65, "obvite" should read -- obviate --. Column 11, line 5, "vent" should read -- event --; line 41, delete "a"; line 43, delete "other", both occurrences; line 47, delete "other". Column 12, line 48, "predetermined" should read -- predeterminately --. Column 13, line 42, "paid" should read -- pair --.

Signed and sealed this 7th day of July 1970.

(SEAL)
Attest:

EDWARD M. FLETCHER, JR.                WILLIAM E. SCHUYLER, JR.
Attesting Officer                      Commissioner of Patents